United States Patent
Mitina

(10) Patent No.: US 6,284,890 B1
(45) Date of Patent: Sep. 4, 2001

(54) AQUEOUS PROCESS FOR THE PREPARATION OF LINEAR QUINACRIDONES HAVING A REDUCED PARTICLE SIZE

(75) Inventor: Valentina K. Mitina, Wilmington, DE (US)

(73) Assignee: CIBA Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 09/503,019

(22) Filed: Feb. 11, 2000

Related U.S. Application Data

(60) Provisional application No. 60/121,863, filed on Feb. 26, 1999.

(51) Int. Cl.$^7$ .................................................. C07D 513/01
(52) U.S. Cl. ................................................................... 546/56
(58) Field of Search ..................................... 546/56

(56) References Cited

U.S. PATENT DOCUMENTS

| | | | |
|---|---|---|---|
| 3,157,659 | 11/1964 | Deuschel et al. | 260/279 |
| 3,200,122 | * 8/1965 | Streiff | 546/56 |
| 3,256,285 | 6/1966 | Fuchs et al. | 260/279 |
| 3,257,405 | 6/1966 | Gerson et al. | 260/279 |
| 3,317,539 | 5/1967 | Jaffe | 260/279 |
| 3,386,843 | 6/1968 | Jaffe et al. | 106/288 |
| 4,455,173 | 6/1984 | Jaffe | 106/288 |
| 5,084,100 | 1/1992 | Bauman | 106/495 |
| 5,368,641 | 11/1994 | Dietz et al. | 106/495 |
| 5,457,203 | 10/1995 | Hendi et al. | 546/56 |
| 5,496,405 | * 3/1996 | Campos et al. | 546/56 |
| 5,755,872 | * 5/1998 | Urban et al. | 546/56 |
| 5,755,873 | 5/1998 | Badejo et al. | 106/497 |
| 5,817,817 | * 10/1998 | Maki et al. | 546/56 |

* cited by examiner

*Primary Examiner*—Alan L. Rotman
*Assistant Examiner*—Raymond Covington
(74) *Attorney, Agent, or Firm*—David R. Crichton

(57) ABSTRACT

A process for the preparation of a quinacridone of the formula:

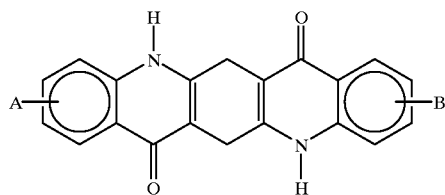

wherein A and B each independently represent a substituent selected from H, F, Cl, $C_1$–$C_3$alkyl and $C_1$–$C_3$alkoxy, including the steps of:

(A) heating a reaction mixture containing (a) at least one unsubstituted and/or substituted 2,5-diarylamino-6,13-dihydroterephthalic acid and (b) about 3 to about 10 parts by weight of polyphosphoric acid per part of component (a) to a temperature of above about 125° C. to form a quinacridone melt;

(B) treating the quinacridone melt resulting from (A) with about 1% to about 30% by weight, based on the weight of component (a), of concentrated sulfuric acid, to form a reaction mixture;

(C) drowning the reaction mixture of (B) in a liquid in which the quinacridone is substantially insoluble; and (D) recovering the resulting quinacridone pigment.

14 Claims, No Drawings

AQUEOUS PROCESS FOR THE PREPARATION OF LINEAR QUINACRIDONES HAVING A REDUCED PARTICLE SIZE

This appln. claims benefit of Prov. Ser. No. 60/121,863 file Filed Feb. 26, 1999.

FIELD OF THE INVENTION

The invention is directed to an aqueous process for the preparation of linear quinacridone pigments. More specifically, the present invention is directed to a process for direct synthesis of pigmentary grade quinacridones of reduced particle size which provide improved rheological properties and high transparency without requiring post-synthesis conditioning steps.

BACKGROUND OF THE INVENTION

Basic processes for forming quinacridones are well known and described, for example, in U.S. Pat. Nos. 3,157,659; 3,256,285; and 3,317,539. (See also "Quinacridones", S. S. Labana et al., *Chemical Review*, 67, 1 through 18 (1967). U.S. Pat. No. 3,257,405 describes a method for preparing quinacridones involving the thermally induced ring closure of 2,5-dianilinoterephthalatic acid precursors or aniline-substituted derivatives thereof in the presence of polyphosphoric acid. The crude quinacridones that result from such processes must be subjected to additional finishing steps to modify the particle shape, crystal structure, and particularly the particle size, to render the quinacridones suitable for use as pigments.

Reducing the particle size of a quinacridone pigment in a coating composition, particularly a paint, leads to a more transparent (as opposed to opaque) finish. Particle size also affects the tinctorial strength and rheological properties of the pigment. Particle size can be controlled by steps taken during synthesis or by post-synthesis treatment ("conditioning"). Methods of controlling quinacridone particle size during synthesis have involved drowning of the quinacridone melt resulting from the ring closing reaction in water and/or alcohol, as described, for example, in U.S. Pat. No. 3,257,405 discussed supra. Another method for regulating quinacridone particle size, as discussed, for example, in U.S. Pat. No. 3,386,843, involves the addition of a particle size growth inhibitor which prevents the growth of crystals during isolation of the quinacridone. The addition of certain quinacridone derivatives to the ring closure step has also been reported. U.S. Pat. No. 5,368,641, for example, discloses the addition of various quinacridone derivatives as crystal growth inhibitors. (See also U.S. Pat. No. 5,457,302). U.S. Pat. No. 5,755,873 describes the introduction of a precursor of a sulfonyl-containing quinacridone additive (e.g., a sulfonyl-containing derivative of 2,5-dianilinoterephthalic acid, a sulfonyl-containing derivative of 2,5-dianilino-3,6-dioxo-1,4-cyclohexadiene-1,4-dicarboxylic acid and/or a sulfonyl-containing derivative of 2,5-dianilino-terephthalic acid) into the cyclizing step. Said precursors are described as being converted to the corresponding sulfonyl-containing quinacridone crystal growth inhibitor additive during the ring closure step.

Post-synthesis conditioning conventionally requires solvent treatment and/or ball milling of the crude quinacridone in the presence of a large amount of an inorganic salt, or premilling in a ball mill followed by homogenization with an organic paste. U.S. Pat. No. 5,084,100 describes the ball milling of a crude quinacridone in the presence of aluminum sulfate and esters of alkane dicarboxylic acid, which function as crystallizing solvents. Subsequent to ball milling, these solvents must be removed from the pigment. Another means for conditioning involves acid pasting in which the crude quinacridone is dissolved in a large quantity of concentrated sulfuric acid to form a solution, which is then drowned in water. Particle size growth inhibitors may also be introduced during conditioning. U.S. Pat. No. 4,455,173 describes the acid pasting or ball milling of a quinacridone in the presence of a 2-phthalimidomethyl quinacridone particle size growth inhibitor.

Notwithstanding the availability of the above-described methods, there has remained a need for quinacridone pigments providing improved transparency and rheological properties as well as excellent coloristic properties. Furthermore, a need remains for a process for preparing such quinacridone pigments that does not require the use of large amounts of hazardous concentrated acids, or environmentally unfriendly organic solvents.

SUMMARY OF THE INVENTION

The present invention, in brief summary, is directed to an aqueous-based process for the preparation of linear quinacridones which have a small particle size and are suitable for use as a pigment as synthesized, without requiring further conditioning steps involving the use of large excesses of concentrated acids (as in acid pasting), organic solvents treatments or premilling to further reduce particle size. Specifically, the aqueous process of the invention comprises:

(A) heating a reaction mixture containing (a) unsubstituted or substituted 2,5-diarylamino-terephthalic acid and (b) about 3 to about 10 parts by weight of polyphosphoric acid per part of component (a) to a temperature of above about 125° C. to form a melt;

(B) treating the melt resulting from (A) for about 5 to about 60 minutes with about 1 to about 30% by weight, based on the weight of component (a), of concentrated sulfuric acid, at a temperature of about 60° C. to about 150° C. to form a reaction mixture;

(C) drowning the reaction mixture of (B) in about 10 to about 30 parts by weight, based on the weight of component (a), of a liquid in which the quinacridone is substantially insoluble, at a temperature of about 30° C. to about 100° C.; and (D) recovering the resulting quinacridone.

The process of the present invention does not rely on the introduction of a pigment additive (or a precursor thereof) into the ring closure, or cyclizing step of quinacridone formation. Instead, the melt resulting from the cyclizing step is treated with a minor amount of concentrated sulfuric acid. This treatment has been found to effectively prevent the growth of the quinacridone crystals during drowning and recovery and allows for the direct synthesis of a pigmentary grade quinacridone.

DETAILED DESCRIPTION OF A PREFERRED EMBODIMENT

Unsubstituted and substituted derivatives of linear quinacridones of the formula:

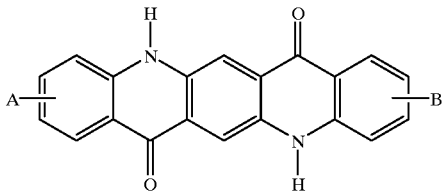

wherein A and B each independently represent a substituent selected from H, F, Cl, $C_1$–$C_3$alkyl and $C_1$–$C_3$alkoxy are prepared via cyclization of a 2,5-diarylaminoterephthalic acid by heating a 2,5-diarylamino-terephthalic acid in the presence of a dehydrating agent, such as polyphosphoric acid. The cyclizing process results in a crude quinacridone, in the form of a melt.

Suitable 2,5-diarylaminoterephthalic acids are well known and include, for example, those derived from primary aromatic amines such as aniline (e.g., 2,-5-dianiloterephthalic acid), o-, m- and p-toluidino (e.g., 2,5-ditoluidinoterephthalic acid), and various xylidines, alpha- and beta-naphthylamine, ethyl, propyl and butyl anilines and other aromatic amines having aromatic carbon structures attached to the amine moiety; from alkoxy substituted primary aromatic amines such as o-, m- and p-anisidines; and halogen substituted primary aromatic amines such as o-, m- and p-chloroaniline, p-bromoaniline, p-iodoaniline, p-fluoroaniline, the dichloro-, dibromo-, diiodo-, and difluoro anilines and the corresponding halogen substituted derivatives of the toluidines, xylidines, naphthylamines, etc. Such 2,5-diarylaminoterephthalic acids can be used individually to form the corresponding unsubstituted or substituted quinacridone, or can be used in mixture to provide a solid solution or mixed crystal of corresponding unsubstituted and substituted quinacridone or two or more substituted quinacridones.

The dehydrating, or ring-closing agent is preferably a polyphosphoric acid thereof which provides an equivalent of at least about 105% orthophosphoric acid ($H_3PO_4$). Commercially available polyphosphoric acids suitable for use has an $H_3PO_4$ equivalent of about 83% $P_2O_5$ or an equivalent of about 115% $H_3PO_4$ and may have a specific gravity of about 2.060 at 20° C. and contain, for example, approximately 5.7% orthophosphoric acid, 21.4% pyrophosphoric acid, 18.0% triphosphoric acid, 13.4% tetraphosphoric acid, 11.4% pentaphosphoric acid, 9.6% hexaphosphoric acid, 7.1% heptaphoric acid and 6.5% nonaphosphoric acid and higher phosphoric acids. Other polyphosphoric acids which contain a higher percentage of acids other than orthophosphoric acid, and therefore analyze as high as 120% $H_3PO_4$ are also suitable for use in the present process. Such materials may be diluted with ordinary $H_3PO_4$ (85%) to reduce the $H_3PO_4$ content of the mixture to any desired value between about 105% and about 115%. An equivalent of an acid methyl ester of a polyphosphoric acid may also be used as the dehydrating agent.

The weight ratio of polyphosphoric acid to 2,5-diarylamino-terphthalic acid reactant will generally be about 3:1 to about 10:1, preferably about 4:1 The terephthalic acid reactant and dehydrating/ring closing agent are together heated to a temperature of about 120° C. to about 160°C., preferably to about 125° C. to about 145° C., most preferably to about 125° C. to about 130° C. to form a melt.

In accordance with the present invention, unsubstituted and substituted quinacridone derivatives having a reduced particle size can be provided without milling or solvent treatment by treating the melt which results from the above-described cyclizing step, for about 5 to about 60 minutes, preferably from about 5 to about 30 minutes, most preferably from about 10 to about 30 minutes, with a minor amount of concentrated sulfuric acid, which by conventional definition has a concentration of U.S.P. 92.5% or above, but which in most commercial forms has a concentration of from about 95% to about 98%. An equivalent of an alkyl-sulfonic acid ($RSO_3H$ wherein R is methyl, ethyl, etc.) may also be used. The concentrated sulfuric acid is added to the melt in an amount of about 1 to about 30% by weight (based on 98% concentration), preferably about 5 to about 15% by weight, most preferably about 1 to about 10% by weight, based on the weight of 2,5-diarylaminoterphthalic acid. This is in contrast to acid pasting which generally employs a weight equivalent, or more commonly a weight excess, of concentrated sulfuric acid.

The sulfuric acid-treated melt is then drowned with about 10 to about 30 parts by weight, preferably about 10 to about 20 parts by weight, most preferably about 15 to about 20 parts by weight water, based on the weight of terephthalic acid of a liquid in which the quinacridone is substantially insoluble. Suitable drowning liquids include water and/or a water miscible organic liquid such as, for example, $C_1$–$C_4$ aliphatic alcohols (e.g., methanol, ethanol, iso-propanol, glycerol, diacetone alcohol, diethylene glycol); ketones and ketoalcohols such as acetone, methyl ethyl ketone, and diacetone alcohol; amides such as and dimethylacetamide; ethers such as tetrahydrofuran, and dioxane; alkylene glycols and triols such as ethylene glycol and glycerol; and other organic liquids known in the art or a mixture thereof. The use of water as the drowning liquid is preferred. After drowning, the quinacridone pigment can be recovered by convention means and dried. Known methods for recovering the quinacridone include, for example, filtration, centrifugation, microfiltration and decanting.

Unsubstituted and substituted quinacridone which can be synthesized using the present process including, for example, unsubstituted quinacridone ("quinacridone"), 2,9-dichloroquinacridone, 2,9-difluoroquinacridone, 4,11-dichloroquinacridone, 2,9-dimethylquinacridone and 2,9-dimethoxyquinacridone. By using mixtures of 2,5-diarylaminoterphthalic acid reactants, the present method can be used to generate quinacridone solid solution pigments, such as solid solutions of quinacridone/2,9-dichloroquinacridone, quinacridone/4,11-dichloroquinacridone, quinacridone/2,9-dimethylquinacridone, quinacridone/2,9-dimethoxyquinacridone or 2,9-dimethylquinacridone/2,9-dimethoxyquinacridone solid solution pigments. In all cases, synthesis results directly in a small particle size product suitable for use as a pigment without additional conditioning steps.

Although the synthesis method of the invention provides a pigmentary grade quinacridone, said quinacridone may still optionally be conditioned post synthesis to adjust the properties of the pigment (e.g., tinctorial strength, degree of transparency). Optional conditioning steps may include milling, solvent treatment or a combination thereof, as is well known in the art. Suitable milling methods may include dry milling (e.g., sand-milling, ball-milling) which can be conducted in the presence or absence of additives; or wet milling (e.g., ball-milling, salt-kneading) in water or organic solvents, either in the presence or absence of additives. Solvent treatment may be conducted, for example, by heating a dispersion of the pigment formed in accordance with the present invention in a suitable solvent, optionally in the presence of additives. Suitable solvents include inorganic solvents such as water, or organic solvents such as alcohols, esters, ketones, aliphatic and aromatic hydrocarbons and derivatives thereof. Additives that may be present during conditioning include, for example, dispersants or surfactants which are all known in the art, as well as antiflocculating agents or rheology-improving agents, such as phthalimidomethylquinacridone, pyrazoylmethylquinacridone, imidazolylmethylquinacridone, quinacridone sulfonic acid and salts thereof, e.g., aluminum salt, or 1,4-diketo-3,6-diphenylpyrrole[3,4-c]pyrrole sulfonic acid and salts thereof. Such antiflocculating agents or rheology-improving are preferably added in amounts of 2 to 10% by weight, most preferably of 3 to 8% by weight, based on the weight of final pigment product.

Depending on the desired end use of the pigment, it may also be advantageous to add texture improving agents, such as fatty acids of not less than 18 carbon atoms, for example stearic acid, or behenic acid or the amides or metal salts thereof, preferably calcium or magnesium salts, as well as plasticizers, waxes, resin acids such as abietic or metal salts thereof, colophonium, alkyl phenols or aliphatic alcohols such as stearyl alcohol or vicinal diols such as dodecanediol-1,2, and also modified colophonium/maleate resins or fumaric acid/colophonium resins or polymeric dispersants. Such texture improving agents are preferably added in amounts of 0.1 to 30% by weight, most preferably of 2 to 15% by weight, based on the weight of final pigment product.

The quinacridone pigments of the present invention are suitable for use in imparting color to high molecular weight organic materials (plastics), glass, ceramic products, cosmetic compositions, ink compositions and especially coating compositions and paints. Generally, the pigments are used in an effective pigmenting amount, for example, 0.01 to 30% by weight, preferably 0.1 to 10% by weight based, for example, on the weight of the high molecular weight organic material to be pigmented. The quinacridone pigments of the present invention may also be used to advantage for such purposes in admixture with transparent and hiding wet, colored, effect and black pigments and transparent, colored, effect and black luster pigments (i.e., those based on metal oxide-coated mica), and metal pigments, platelet-shaped iron oxides, graphite, molybdenum sulfide and platelet-shaped organic pigments.

A paint or coating composition according to the invention may comprise a film-forming vehicle compounded with the above described quinacridone pigment. The film-forming vehicle of the inventive coating composition is not particularly limiting and any conventional resin can be used according to the intended application of the inventive coating composition. Examples of suitable film-forming vehicle resins include synthetic resins such as acrylic resins, polyester resins, resin mixtures of an acrylic resin and cellulose acetate butyrate ("CAB"), CAB-grafted acrylic resins, alkyd resins, urethane resins, epoxy resins, silicone resins, polyamide resins, epoxy-modified alkyd resins, phenolic resins and the like as well as various kinds of natural resins and cellulose derivatives. These film-forming vehicle resins can be used either singly or as a combination of two kinds or more according to need. If necessary, the above named film-forming vehicle resins are used as combined with a curing agent such as melamine resins, isocyanate compounds, isocyanate compounds having a block-wise structure, polyamine compounds and the like.

In addition to the above described film-forming vehicle resins, chromatic-color metal flake pigments and colored pigments of other types may optionally be added to the composition. The coating composition of the invention can be admixed with various kinds of additives conventionally used in coating compositions including, for example, surface conditioning agents, fillers, siccatives, plasticizers, photostabilizers, antioxidants and the like according to need.

The form of the inventive coating composition is not particularly limiting and includes solutions in an organic solvent, aqueous solutions, powders and emulsions. The process for film-forming of the inventive coating composition can be performed by drying at room temperature, curing by baking and curing by the irradiation with ultraviolet light or electron beams without particular limitations.

When the inventive coating composition is in the form of a solution in an organic solvent, the solvent suitable therefor is not particularly limiting and includes those organic solvents used conventionally in solution-type coating compositions. Examples of suitable organic solvents include aromatic hydrocarbon solvents such as toluene, xylene and the like, olefin compounds, cycloolefin compounds, naphthas, alcohols such as methyl, ethyl, isopropyl and n-butyl alcohols, ketones such as methyl ethyl ketone and methyl isobutyl ketone, esters such as ethyl acetate and butyl acetate, chlorinated hydrocarbon compounds such as methylene chloride and trichloroethylene, glycol ethers such as ethylene glycol monoethyl ether and ethylene glycol monobutyl ether, glycol monoether monoesters such as ethylene glycol monomethyl ether acetate and ethylene glycol monoethyl ether acetate and so on.

The coating composition of the present invention can be prepared via any method used for the preparation of conventional coating compositions of the respective type. The coating composition of the invention can be applied to any substrate material including, for example, metal, wood, plastic, glass, ceramic and the like without particular limitations. The coating method is also not particularly limiting and any of conventional coating methods can be undertaken including, for example, air-spray coating, airless coating, electrostatic coating, roll-coater coating and the like. The coating work can be applied using a one-coat method, two-coat method and so on depending on the intended application of the coated articles.

An ink composition of the present invention contains a film-forming material and a coloring agent comprising the above described quinacridone pigment. All film-forming materials used to form conventional ink compositions may be used to form the ink compositions of the present invention without particular limitation. Examples of film-forming materials suitable for such purposes include, for example, synthetic resins such as phenolic resins, alkyd resins, polyamide resins, acrylic resins, urea resins, melamine resins and polyvinyl chloride resins, natural resins such as Gilsonite, cellulose derivatives and vegetable oils such as linseed oil, tung oil and soybean oil. Optionally, two or more kinds of such film-forming materials may be used in combination according to the intended application of the ink composition.

In addition to the above described film-forming material, chromatic-color metal flake pigment and other colored pigments may optionally be added according to need. The ink composition of the present invention can be admixed with various kinds of additives conventionally used in ink compositions such as waxes, plasticizers, dispersing agents and the like according to need. Further, the form of the inventive ink composition is not particularly limited and includes solutions in an organic solvent, aqueous solutions and aqueous emulsions.

When the inventive ink composition is in the form of a solution in an organic solvent, various kinds of organic solvents can be used therefor without particular limitations as being selected from those used in conventional solution-type ink compositions. Examples of suitable organic solvents include, for example, aromatic hydrocarbon solvents such as toluene and xylene, olefin compounds, cycloolefin compounds, naphthas, alcohols, such as methyl, ethyl, isopropyl and n-butyl alcohols, ketones such as methyl ethyl ketone and methyl isobutyl ketone, esters such as ethyl acetate and butyl acetate, chlorinated hydrocarbon compounds such as methylene chloride and trichloroethylene glycol ethers such as ethylene glycol monoethyl ether and ethylene glycol monobutyl ether, glycol monoether monoesters such as ethylene glycol monomethyl ether acetate and ethylene glycol monoethyl ether acetate and so on.

The inventive ink composition can be prepared via any method used in the preparation of prior art to form conventional ink compositions of the respective types. The ink composition of the invention can be used in printing works in any conventional manner such as screen printing, rotogravure, bronze printing, flexographic printing, offset printing and ink-jet printing.

A colored high molecular weight material (having a weight average molecular weight ($M_w$) of $10^5$ to $10^7$ g/mol, or more) or molding material in accordance with the present invention contains, as the coloring agent, the above-described quinacridone pigment. The plastic resin which constitutes the principal ingredient of the inventive molding compound is not particularly limited and any plastic resins conventionally used in the prior art for molding of shaped articles can be employed. Examples of such plastic resins include polyvinyl chloride resins, plasticized polyvinyl chloride resins, polyethylene resins, polypropylene resins, ABS resins, phenolic resins, polyamide resins, alkyd resins, urethane resins, melamine resins and the like.

Optionally, the plastic resin of the inventive molding compound is compounded with chromatic-color metal flake pigments and/or with other colored pigments of other types to further enhance the aesthetic coloring effect. The inventive molding compound of plastic resin may also optionally contain various kinds of fillers and other additives conventionally used in plastic resin-based molding compounds of the prior art. Various forms of shaped articles can be prepared from the inventive molding compound by a known methods such as by extrusion molding and injection molding.

In the following, examples are given to illustrate the present invention in more detail. Said examples are not intended to limit the scope of the invention in any manner. In the following examples, diffraction angles are measured on a RIGAKU GEIGERFLEX diffractometer type D/Maxll v BX.

EXAMPLE 1

A) Ring closure: 100 g of 2,5-dianilinoterephthalic acid was introduced with stirring at 80°–90° C. into 400 g of polyphosphoric acid, containing 115–119% $P_2O_5$, and the mixture was heated at 125° C. for 1 hour, during which time ring closure occurred to form the corresponding quinacridone.

B) Sulfonation process: 1 g of concentrated sulfuric acid (98%) was added to the reaction mixture of (A) and the resulting slurry was heated at 125° C. for 0.5 hour.

C) Drowning: The reaction mixture of (B) was then drowned into 1000 g of water at 60° C. with vigorous agitation. During this process, the temperature rose to 80° C. The mixture was stirred at 80°–60° C. for 0.5–1 hour and the crude pigment was then filtered off and washed until neutral.

560 g of a crude (α-phase) of quinacridone with 98% purity and having very small particle size was obtained. The resulting α-phase quinacridone pigment displays diffraction angles of 6.037 ( β½=1.261), 14.013, 25.87, 27.19, 27; the high β½ value of 1.261 indicating that the synthesis product had a small particle size.

EXAMPLE 2

A) Ring closure: 100 g of 2,5-dianilinoterephthalic acid were introduced with stirring at 80°–90° C. into 400 g of polyphosphoric acid, containing 115–119% $P_2O_5$, and the mixture was heated at 125° C. for 1 hour, during which time ring closure occurred to form the corresponding quinacridone.

B) Sulfonation process: 1.5 g of concentrated sulfuric acid was added to the reaction mixture of (A) and the resulting slurry was heated at 125° C. for 0.5 hour.

C) Drowning: The reaction mixture of (B) was then drowned into 1500 g of water at 60° C. with vigorous agitation. During this process, the temperature rose to 75° C. The mixture was stirred at 60°–75° C. for 0.5–1 hour and the crude pigment was then filtered off and washed until neutral.

558 g of a crude (α-phase) quinacridone with 98% purity and with very small particle size was obtained. The resulting α-phase quinacridone pigment displayed diffraction angles of 6.037 ( β½=1.32), 14.013, 25.87, 27.19, 27.185; the high β½ value of 1.32 indicating that synthesis product had a small particle size.

EXAMPLE 3

A) Ring closure: 100 g of 2,5-dianilinoterephthalic acid were introduced with stirring at 80°–90° C. into 400 g of polyphosphoric acid, containing 115–119% $P_2O_5$, and the mixture was heated at 125° C. for 1 hour, during which time ring closure occurred to form the corresponding quinacridone.

B) Sulfonation process: 2 g of concentrated sulfuric acid were added to the reaction mixture of (A) and the resulting slurry was heated at 125° C. for 0.5 hour.

C) Drowning: The reaction mixture of (B) was then drowned into 2000 g of water at 60° with vigorous agitation. During this process, the temperature rose to 70° C. The mixture was stirred at 60°–70° C. for 0.5–1 hour and the crude pigment was then filtered off and washed until neutral.

558 g of a crude (α-phase) of quinacridone with 98% purity and with very small particle size was obtained. The α-phase quinacridone pigment displayed diffraction angles of 6.037 (β½=1.41), 14.013, 25.87, 27.19, 27.185; the high β½ value of 1.41 indicating that the synthesis product had a small particle size.

EXAMPLE 4

A) Ring closure: 100 g of 2,5-dianilinoterephthalic acid were introduced with stirring at 80°–90° C. into 400 g of polyphosphoric acid, containing 115–119% $P_2O_5$, and the mixture was heated at 125° C. for 1 hour, during which time ring closure occurred to form the corresponding quinacridone.

B) Sulfonation process: 10 g of concentrated sulfuric acid were added to the reaction mixture of (A) and the resulting slurry was heated at 125° C. for 5 min.

C) Drowning: The reaction mixture of (B) was then drowned into 2000 g of water at 60° with vigorous agitation. During this process, the temperature rose to 70° C. The mixture was stirred at 60°–70° C. for 0.5–1 hour and the crude pigment was then filtered off and washed until neutral.

558 g of a crude (α-phase) quinacridone with 98% purity and very small particle size was obtained. The α-phase quinacridone pigment displayed diffraction angles of 6.037 (β½=1.38), 14.013, 25.87, 27.19, 27.185; the high β½ value of 1.38 indicating that the synthesis product had a small particle size.

EXAMPLE 5

A) Ring closure: 100 g of 2,5-dianilinoterephthalic acid were introduced with stirring at 80°–90° C. into 400 g of polyphosphoric acid, containing 115–119% $P_2O_5$, and the mixture was heated at 125° C. for 1 hour, during which time ring closure occurred to form the corresponding quinacridone.

B) Sulfonation process: 5 g of concentrated sulfuric acid was added to the reaction mixture of (A) and the resulting slurry was heated at 125° C. for 5 min.

C) Drowning: The reaction mixture of (B) was then drowned into 1000 g of water at 60° with vigorous agitation. During this process, the temperature rose to 80° C. The mixture was stirred at 60°–80° C. for 0.5–1 hour and the crude pigment was then filtered off and washed until neutral.

558 g of a crude (α-phase) quinacridone with 98% purity and very small particle size was obtained. The α-phase quinacridone pigment displayed diffraction angles of 6.037 (β½=1.48), 14.013, 25.87, 27.19, 27.185; the high β½ value of 1.48 indicating that the synthesis product had a small particle size.

EXAMPLE 6

A) Ring closure: 100 g of 2,5-di(toluidino)terephthalic acid were introduced with stirring at 80–90° C. into 400 g polyphosphoric acid containing 115% $P_2O_5$, and the mixture was heated at 125° C. for 1 hour during which time ring closure occurred to form the corresponding quinacridone.

B) Sulfonation process: 1 g of concentrated sulfuric acid was added to the reaction mixture of (A). The resulting slurry was stirred at 125° C. for 0.5 hour.

C) Drowning The reaction mixture of (B) was then drowned into 2000 g of water at 60° to 80° C. with vigorous agitating. During this process the temperature rose to 70° C. The mixture was stirred 1 hour at 60°–70° C., and the crude was then filtered off and washed with hot water (60°) until neutral. The wet presscake can be dried or used as is for specific applications. A 2,9-dimethylquinacridone product was obtained as a magenta pigment, which displayed diffraction angles 5.39 (β½=1.191), 10.68, 14.05, 26.89; the high β½ value of 1.261 indicating that the synthesis product had a small particle size.

EXAMPLE 7

A) Ring closure: 100 g of 2,5-di(toluidino)terephthalic acid were introduced with stirring at 80–90° C. into 400 g polyphosphoric acid containing 115% $P_2O_5$, and the mixture was heated at 125° C. for 1 hour during which time ring closure occurred to form the corresponding quinacridone.

B) Sulfonation process: 10 g of concentrated sulfuric acid were added to the reaction mixture of (A). The resulting slurry was stirred at 125° C. for 0.5 hour.

C) Drowning: The reaction mixture of (B) was then drowned into 2000 g of water at 60° to 80° C. with vigorous agitating. During this process the temperature rose to 70° C. The mixture was stirred 1 hour at 60°–70°C., and the crude was then filtered off and washed with hot water (60°) until neutral. The resulting wet presscake can be dried or used as is for specific applications. A 2,9-dimethylquinacridone product was obtained as a magenta pigment. This pigment display diffraction angles of 5.39 (β½=1.23), 10.68, 14.05, 26.89: the high β½ value of 1.23 indicating that the synthesis product has a small particle size.

EXAMPLE 8

A) Ring closure: 30 g of 2,5-dianilinoterephthalic acid and 30 g of 2,5-di(toluidino)-terephthalic acid were introduced with stirring at 70–80° C. into 300 g polyphosphoric acid containing 115% $P_2O_5$, and the mixture was heated at 125° C. for 2 hours during which time ring closure occurred to form a solid solution of the corresponding quinacridones.

B) Sulfonation process: 1 g of concentrated sulfuric acid was added to the reaction mixture of (A). The resulting slurry was stirred at 90° C. for 5 minutes.

C) Drowning: The reaction mixture of (B) was then drowned into 2000 g of water at 60° to 80° C. with vigorous agitating. During this process the temperature rose to 70° C. The mixture was stirred 1 hour at 60–70° C., and the crude was then filtered off and washed with hot water (60°) until neutral. The resulting wet presscake can be dried or used as is for specific applications. A solid solution of quinacridone/2,9-dimethylquinacridone product was obtained as a magenta pigment. This pigment displayed a β½ value of 1.211 indicating that the synthesis product had a small particle size.

I claim:

1. A process for the preparation of a quinacridone of the formula:

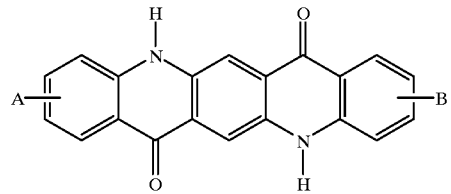

wherein A and B each independently represent a substituent selected from H, F, Cl, $C_1$–$C_3$alkyl and $C_1$–$C_3$alkoxy, said process comprising:

(A) heating a reaction mixture containing (a) at least one unsubstituted and/or substituted 2,5-diarylaminoterephthalic acid and (b) about 3 to about 10 parts by weight of polyphosphoric acid per part of component (a) to a temperature of above about 125° C. to form a quinacridone melt;

(B) treating the quinacridone melt resulting from (A) with about 1% to about 30% by weight, based on the weight of component (a), of concentrated sulfuric acid, to form a reaction mixture;

(C) drowning the reaction mixture of (B) in a liquid in which the quinacridone is substantially insoluble; and (D) recovering the resulting quinacridone pigment.

2. The process of claim 1, wherein said (a) at least one unsubstituted and/or substituted 2,5-diarylaminoterephthalic acid is heated with about 3 to about 10 parts by weight of polyphosphoric acid per part of component (a) to form said quinacridone melt.

3. The process of claim 1, wherein said (a) at least one unsubstituted and/or substituted 2,5-diarylaminoterephthalic acid is heated with said polyphosphoric acid at a temperature of from about 125° C. to about 145° C.

4. The process of claim 1, wherein said quinacridone melt is treated with said concentrated sulfuric acid for about 5 to about 60 minutes.

5. The process of claim 1, wherein said quinacridone melt is treated with said concentrated sulfuric acid at a temperature of about 60° C. to about 150° C.

6. The process of claim 1, wherein said quinacridone melt, subsequent to treatment with said concentrated sulfuric acid, is drowned in about 10 to about 30 parts by weight, based on the weight of component (a), of a liquid in which the quinacridone is substantially insoluble.

7. The process of claim 1, wherein said quinacridone melt, subsequent to treatment with said concentrated sulfuric acid, is drowned in a liquid in which the quinacridone is substantially insoluble, at a temperature of about 30° C. to about 100° C.

8. The process of claim 1, wherein said liquid in which the quinacridone is substantially insoluble is water or an organic solvent.

9. The process according to claim 8, wherein said organic solvent is selected from alcohols, esters, ketones, aliphatic and aromatic hydrocarbons and derivatives thereof.

10. The process of claim 8, wherein said liquid in which the quinacridone is substantially insoluble is water.

11. The process of claim 1, wherein said at least one unsubstituted and/or substituted 2,5-diarylaminoterephthalic acid is unsubstituted or substituted 2,5-dianilinoterephthalic acid, unsubstituted or substituted 2,5-ditoluidinoterephthalic acid or a mixture thereof.

12. The process of claim 1, wherein said quinacridone is selected from the group consisting of unsubstituted quinacridone, 2,9-dichloroquinacridone, 2,9-difluoroquinacridone, 4,11-dichloroquinacridone, 2,9-dimethylquinacridone and 2,9-dimethoxyquinacridone.

13. The process of claim 1, wherein said quinacridone is a quinacridone solid solution selected from the group consisting of quinacridone/2,9-dichloroquinacridone, quinacridone/4,11 dichloroquinacridone, quinacridone/2,9-dimethylquinacridone, quinacridone/2,9-dimethoxyquinacridone or 2,9-dimethylquinacridone/2,9-dimethoxyquinacridone solid solutions.

14. The process of claim 11, wherein said quinacridone is selected from the group consisting of unsubstituted quinacridone, 2,9-dimethylquinacridone and quinacridone/2,9-dimethylquinacridone solid solution.

* * * * *